United States Patent
Trivedi et al.

(10) Patent No.: US 11,615,421 B2
(45) Date of Patent: Mar. 28, 2023

(54) METHODS, SYSTEM AND COMPUTER PROGRAM PRODUCT FOR SELECTIVELY RESPONDING TO PRESENTATION OF PAYMENT CARD INFORMATION

(71) Applicant: MASTERCARD INTERNATIONAL INCORPORATED, Purchase, NY (US)

(72) Inventors: Shashank Kumar Trivedi, Dwarka (IN); Ankur Arora, Sarita Vihar (IN); Rajesh Chopra, Gurgaon (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 16/119,701

(22) Filed: Aug. 31, 2018

(65) Prior Publication Data
US 2019/0080326 A1   Mar. 14, 2019

(30) Foreign Application Priority Data
Sep. 12, 2017 (IN) .............................. 201711032269

(51) Int. Cl.
*G06Q 20/40* (2012.01)

(52) U.S. Cl.
CPC ....... *G06Q 20/409* (2013.01); *G06Q 20/4012* (2013.01); *G06Q 20/40145* (2013.01); *G06Q 2220/00* (2013.01)

(58) Field of Classification Search
CPC ........ G06Q 40/12; G06Q 20/10; G06Q 20/02; G06Q 20/32; G06Q 40/00; G06Q 20/38; G06F 17/60
See application file for complete search history.

(56) References Cited

U.S. PATENT DOCUMENTS 8,010,429 B2 * 8/2011 Anderson .............. G06Q 20/10
                                                     705/35
9,152,959 B2 * 10/2015 Markison ............. G06Q 20/409
(Continued)

FOREIGN PATENT DOCUMENTS

FR   WO-2008027621   *   3/2008   ............. G06Q 20/10
KR   1020070020772 A      2/2007
(Continued)

OTHER PUBLICATIONS

Examination Report issued in Indian Application No. 201711032269, dated Nov. 11, 2019, 6 pages.

*Primary Examiner* — Mike Anderson
*Assistant Examiner* — Matthew Cobb
(74) *Attorney, Agent, or Firm* — Talem IP Law, LLP (57) ABSTRACT

Methods, systems and computer program products for selectively providing authenticated data corresponding to a payment card holder at a point-of-sale (POS) terminal are described. The method can include receiving from a terminal device, payment card account information comprising a payment card account identifier and user authentication information. Responsive to the received user authentication information matching one of a plurality of predefined authentication keys associated with the payment card account identifier, a predefined function is selected from among at least first and second predefined functions associated with the payment card account identifier—wherein the selection of the predefined function from among the first and second predefined functions is based on an association between the selected predefined function and an authentication key that has been matched with the received user authentication information.

19 Claims, 6 Drawing Sheets

(56) References Cited

U.S. PATENT DOCUMENTS

| | | | |
|---|---|---|---|
| 9,769,134 B2* | 9/2017 | Dominguez | G06Q 20/382 |
| 2002/0038287 A1* | 3/2002 | Villaret | G06Q 20/105 |
| | | | 705/41 |
| 2005/0049969 A1* | 3/2005 | Kane | G06Q 20/04 |
| | | | 705/45 |
| 2006/0157553 A1* | 7/2006 | Kelley | G06Q 20/40 |
| | | | 235/492 |
| 2008/0027621 A1* | 3/2008 | Tumminaro | G06Q 20/10 |
| 2012/0131655 A1 | 5/2012 | Bender et al. | |
| 2014/0074724 A1* | 3/2014 | Gordon | G06Q 20/3829 |
| | | | 705/44 |
| 2015/0106274 A1* | 4/2015 | Rodriguez | G06Q 20/24 |
| | | | 705/72 |
| 2015/0178854 A1* | 6/2015 | Brinkman | G06Q 40/12 |
| | | | 705/30 |
| 2016/0012445 A1* | 1/2016 | Villa-Real | G06Q 20/40145 |
| | | | 705/44 |
| 2019/0164161 A1* | 5/2019 | Sultan | G06Q 20/4012 |

FOREIGN PATENT DOCUMENTS

| | | | | |
|---|---|---|---|---|
| KR | 100869136 B1 | 11/2008 | | |
| WO | WO-2008027621 A1 * | 3/2008 | | G06Q 20/10 |

\* cited by examiner

| Account ID | Associated Authentication Key / PIN | Designated Function |
|---|---|---|
| "WWWW.XXXX.YYYY.ZZZZ" | 1234 | Authorize a requested payment card transaction |
| "WWWW.XXXX.YYYY.ZZZZ" | 2345 | Generate and transmit a financial report based on account holder data available with the issuer network |
| "WWWW.XXXX.YYYY.ZZZZ" | 3456 | Generate and transmit a financial report based on account holder data available with the card network |
| "PPPP.QQQQ.RRRR.SSSS" | 4567 | Authorize a requested payment card transaction |
| "PPPP.QQQQ.RRRR.SSSS" | 5678 | Generate and transmit a financial report based on account holder data available with the issuer network |
| "PPPP.QQQQ.RRRR.SSSS" | 6789 | Generate and transmit a financial report based on account holder data available with the card network |

METHODS, SYSTEM AND COMPUTER PROGRAM PRODUCT FOR SELECTIVELY RESPONDING TO PRESENTATION OF PAYMENT CARD INFORMATION

FIELD OF THE INVENTION

The present invention relates to the field of electronic transactions, and more specifically to a method for selectively providing authenticated data corresponding to a payment card holder at a point-of-sale (POS) terminal.

BACKGROUND OF THE INVENTION

Proliferation of payment cards such as credit cards or debit cards has increased the number of electronic transactions conducted over a variety of terminal devices, including, for example, POS terminals, computer terminals and smartphones. The inclusion of one or more of a secure personal identification number (PIN), semi-conductor chips that are disposed within a payment card, and in certain cases multiple factor authentication, provides secure mechanisms for electronic transactions and has led to increased adoption of payment cards as a preferred instrument of payment.

It has been found that despite increased access to electronic payment mechanisms, card holders and merchants do not have access to a convenient and reliable service through which the card holder may provide any party (e.g., a merchant) with authenticated information comprising identity information or financial history information (or both) corresponding to the card holder.

The requirement for a mechanism to communicate authenticated information of this type is particularly felt where the card holder (e.g., a small business or a merchant) requires to demonstrate financial credibility or financial reliability to a third party (e.g., a purchaser, vendor or supplier of goods or services) for the purposes of establishing business credibility. Since small businesses often work on credit, and rely on symbiotic relationships with other businesses or merchants (for example, where one depends on the other for payments, or where each mutually agrees to defer payments), it is essential that parties be able to establish certain minimum financial credibility at an early stage in a cost and time efficient manner. Additionally, in view that some of the information necessary to establish financial credibility is by its nature highly confidential, there is a need to ensure that any such mechanism is secure.

The present invention provides an efficient and secure mechanism to address the above requirements. Additionally, the invention enables this mechanism to be implemented using payment cards and end terminals (for example, POS terminals).

SUMMARY

The present invention provides methods, systems and computer program products for selectively providing authenticated data corresponding to a payment card holder at a point-of-sale (POS) terminal.

In an embodiment, the invention provides a method for implementing a selective response to presentation of payment card information. The method includes receiving from a terminal device, payment card account information comprising a payment card account identifier and user authentication information. Responsive to the received user authentication information matching one of a plurality of predefined authentication keys associated with the payment card account identifier, a predefined function is selected from among at least first and second predefined functions associated with the payment card account identifier—wherein the selection of the predefined function from among the first and second predefined functions is based on an association between the selected predefined function and an authentication key that has been matched with the received user authentication information. The selected predefined function is thereafter implemented. The first predefined function may comprise authorization of a requested electronic payment transaction. The second predefined function may comprise transmitting to the terminal device, financial history information corresponding to the payment card account identifier. In a particular embodiment of the method, the transmitted financial history information may be displayed, printed or rendered at the terminal device.

Selection of the predefined function from among the first and second predefined functions may be based exclusively on the association between the selected predefined function and the authentication key that has been matched with the received user authentication information.

The financial history information may, in an embodiment, be retrieved from at least one of a card network database and an acquirer network database. In a more specific embodiment, the financial history information may include data retrieved from both the card network database and the acquirer network database.

In one embodiment, responsive to selection of the second designated function, a service fee associated with transmission of financial history information may be charged to the payment card. In a more particular embodiment, responsive to selection of the second designated function, a service fee associated with transmission of financial history information is charged to the payment card, and a first share of the service fee is credited to the card network and a second share of the service fee is credited to the issuer network.

The invention additionally provides a system for implementing a selective response to presentation of payment card information. The system according to the present invention includes a processor implemented authentication engine configured to (i) receive from a terminal device, payment card account information comprising a payment card account identifier and user authentication information, (ii) responsive to the received user authentication information matching one of a plurality of predefined authentication keys associated with the payment card account identifier, select a predefined function from among at least first and second predefined functions associated with the payment card account identifier, wherein selection of the predefined function from among the first and second predefined functions is based on an association between the selected predefined function and an authentication key that has been matched with the received user authentication information, and (iii) implement the selected predefined function. In a system embodiment, the authentication engine may be configured such that the first predefined function comprises authorization of a requested electronic payment transaction, and/or the second predefined function comprises transmitting to the terminal device, financial history information corresponding to the payment card account identifier.

The terminal device may be configured for displaying, printing or rendering the transmitted financial history information.

In an embodiment, the authentication engine may be configured such that selection of the predefined function from among the first and second predefined functions is based exclusively on the association between the selected predefined function and the authentication key that has been matched with the received user authentication information. The authentication engine may further be configured such that the financial history information is retrieved from at least one of a card network database and an acquirer network database. In a more particular embodiment, the authentication engine may be configured such that the financial history information comprises data retrieved from both the card network database and the acquirer network database.

The system may be configured so that, in response to selection of the second designated function, a service fee associated with transmission of financial history information is charged to the payment card. In a specific embodiment, responsive to selection of the second designated function, a service fee associated with transmission of financial history information is charged to the payment card, and a first share of the service fee is credited to the card network and a second share of the service fee is credited to the issuer network.

The invention additionally relates to a computer program product for implementing a selective response to presentation of payment card information. The computer program product comprises a non-transitory computer usable medium having computer readable program code embodied therein. The computer readable program code may include instructions for (i) receiving from a terminal device, payment card account information comprising a payment card account identifier and user authentication information, (ii) responsive to the received user authentication information matching one of a plurality of predefined authentication keys associated with the payment card account identifier, selecting a predefined function from among at least first and second predefined functions associated with the payment card account identifier, wherein selection of the predefined function from among the first and second predefined functions is based on an association between the selected predefined function and an authentication key that has been matched with the received user authentication information, and (iii) implementing the selected predefined function. The first predefined function may include authorization of a requested electronic payment transaction. The second predefined function may comprise transmitting financial history information corresponding to the payment card account identifier, to the terminal device.

DETAILED DESCRIPTION

The present invention enables a payment card (such as a credit card or debit card) or payment card information to be selectively used for (i) effecting an electronic transaction and (ii) enabling generation and communication (to a terminal device) of authenticated identity information or financial history information corresponding to the payment card or the card holder.

For the purposes of the present invention, the following terms shall be understood to have the corresponding meanings provided below:

"Acquirer" shall mean a business (e.g., a financial institution or a merchant bank) that contracts with a merchant to coordinate with the issuer network of a customers' payment card.

"Acquirer network" shall refer to a communication network, including hardware, software and other equipment used by an acquirer to transmit and process card based transactions and information related to merchants, customers, payment cards and transactions.

"Card holder" or "Customer" shall mean an authorized payment card user who is making a purchase or effecting an electronic transaction with a payment card.

"Card network" shall refer to the intermediary between the merchant's acquirer and the customer's issuer (for example, Mastercard® or Visa®). The card network primarily coordinates payment card transactions between acquirers and issuers, and additionally coordinates clearing and settlement services to transfer payments from issuers to merchants.

"Issuer" shall mean a financial institution that issues payment cards and maintains a contract with a customer or card holder for repayment or settlement of purchases made on the payment card.

"Issuer network" shall refer to a communication network, including hardware, software and other equipment used by an issuer to transmit and process payment card transactions and information related to customers, payment cards and transactions.

"Merchant" shall mean an authorized acceptor of payment cards for the payment of goods or services sold by the merchant.

"Payment card" shall mean a card or data associated with a payment account that may be provided to a merchant in order to fund a financial transaction via the associated payment account. Payment cards may include credit cards, debit cards, charge cards, stored-value cards, prepaid cards, fleet cards, virtual payment numbers, virtual card numbers, controlled payment numbers, etc. A payment card may be a physical card that may be provided to a merchant, or may be data representing the associated payment account (e.g., as stored in a communication device, such as a smart phone or computer). For example, in some instances, data including a payment account number may be considered a payment card for the processing of a transaction funded by the associated payment account. In some instances, a check may be considered a payment card where applicable.

"Record information" shall mean information comprising identity information or financial history information (or both) corresponding to a payment card, payment card account or payment card holder.

"Terminal device" shall mean any device that is capable of receiving information for identifying a payment card, or card holder, authenticating a card holder, and transmitting payment card information or customer information directly or indirectly to one or more of an acquirer network, card network or issuer network. Non-limiting embodiments of terminal devices include POS terminals, computing devices including desktops, laptops, tablets and personal digital assistants, and telecommunication devices including wired line telephones, mobile phones and smartphones.

Figure 1:
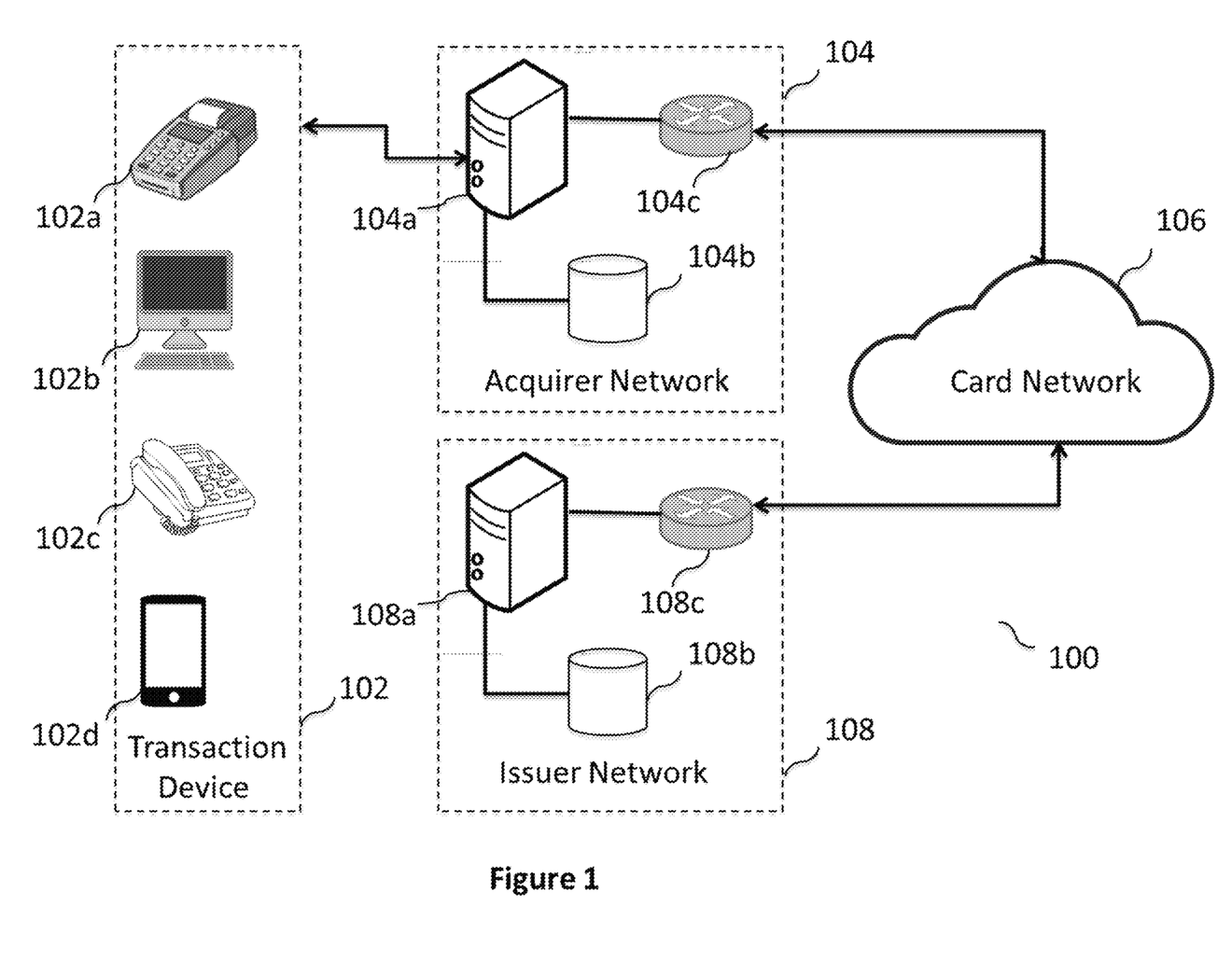
FIG. 1 illustrates a system for authenticating and implementing payment card transactions.

FIG. 1 illustrates a system 100 that can be used for implementing electronic transactions based on a payment card or payment card information presented by a card holder at a terminal device 102. System 100 includes terminal device 102, acquirer network 104, card network 106 and issuer network 108.

Acquirer network 104 may be communicably coupled with terminal device 102, and comprises server 104a, acquirer network database 104b and interface gateway 104c. Server 104a may be configured to receive and process information relating to payment card transactions. In an embodiment, the acquirer network may receive or process transactions received only from merchants having a merchant account with the acquirer—which determination may be made based on information retrieved from acquirer network database 104b. Interface gateway 104c may include a hardware or software network gateway configured to enable acquirer network 104 to communicate with card network 106.

Card network 106 may be communicably coupled to both acquirer network 104 and issuer network 108.

Issuer network 108 comprises server 108a, issuer network database 108b and interface gateway 108c. Server 108a may be configured to receive and process information relating to payment card transactions. In an embodiment, the issuer network may only receive or process transactions received from merchants having a merchant account with the issuer— which determination may be made based on information retrieved from issuer network database 108b. Interface gateway 108c may include a hardware or software network gateway configured to enable issuer network 108 to communicate with card network 106.

It would be understood that terminal device 102 may comprise any of POS terminal 102a, computing device 102b, wired line telephone 102c or mobile phone or smartphone 102d.

The present invention contemplates multiple authentication keys (for example multiple PINs) being assigned to (or associated with) a payment card, payment card account or card holder. In an embodiment a payment card, payment card account or card holder has at least a first authentication key and a second authentication key associated therewith. In other embodiments, each payment card, payment card account or card holder may have more than two authentication keys associated therewith.

Each authentication key associated with a payment card, payment card account or card holder additionally has an associated designated function. Association of functions designated for each authentication key may depend on the implementation that is contemplated. In a preferred embodiment, a first authentication key associated with the payment card, payment card account or card holder may be associated with an instruction for authorizing an electronic transaction that has been requested at a terminal device, while a second authentication key associated with the payment card, payment card account or card holder may be associated with an instruction for communicating identity information or financial history information corresponding to the card holder (or corresponding to the payment card), to the terminal device at which the second authentication key has been input by the card holder. In an embodiment, the invention also enables enrolling or registration of authentication keys corresponding to a card holder, and correlating each enrolled authentication key to a corresponding designated function.

Figure 4:
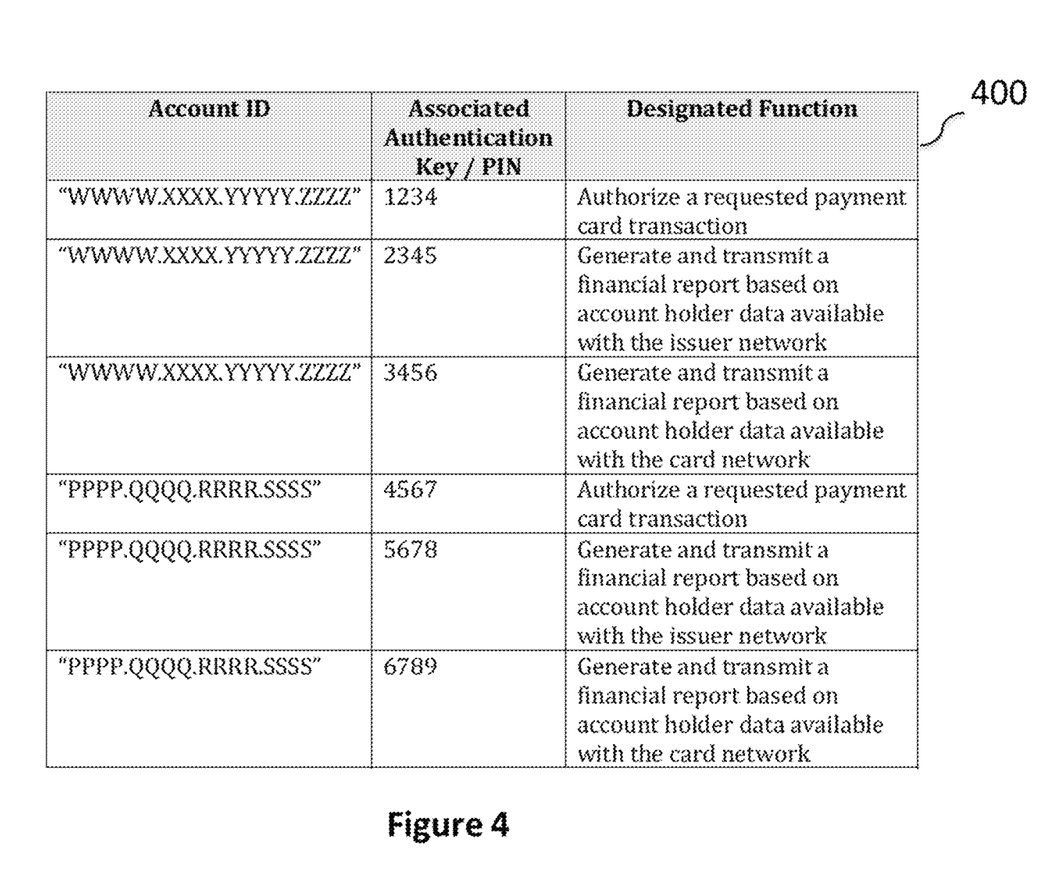
FIG. 4 illustrates an exemplary data structure configured to implement an embodiment of the present invention.

FIG. 4 illustrates an exemplary data structure 400 (for example a database schema) or part thereof, configured to store (i) an authentication key associated with a payment card, payment card account or card holder, and (ii) the corresponding unique functions designated with each authentication key.

For example, as illustrated in FIG. 4, account ID "WWWW.XXXX.YYYY.ZZZZ" has numeric authentication keys 1234, 2345 and 3456 associated therewith—each authentication key having a corresponding designated function associated therewith—such that receipt of card information identifying account ID "WWWW.XXXX.YYYY.ZZZZ" and receipt of one of the authentication key associated therewith, would result in implementation of the designated function associated with the received authentication key. FIG. 4 is discussed in more detail later in this specification.

Figure 2:
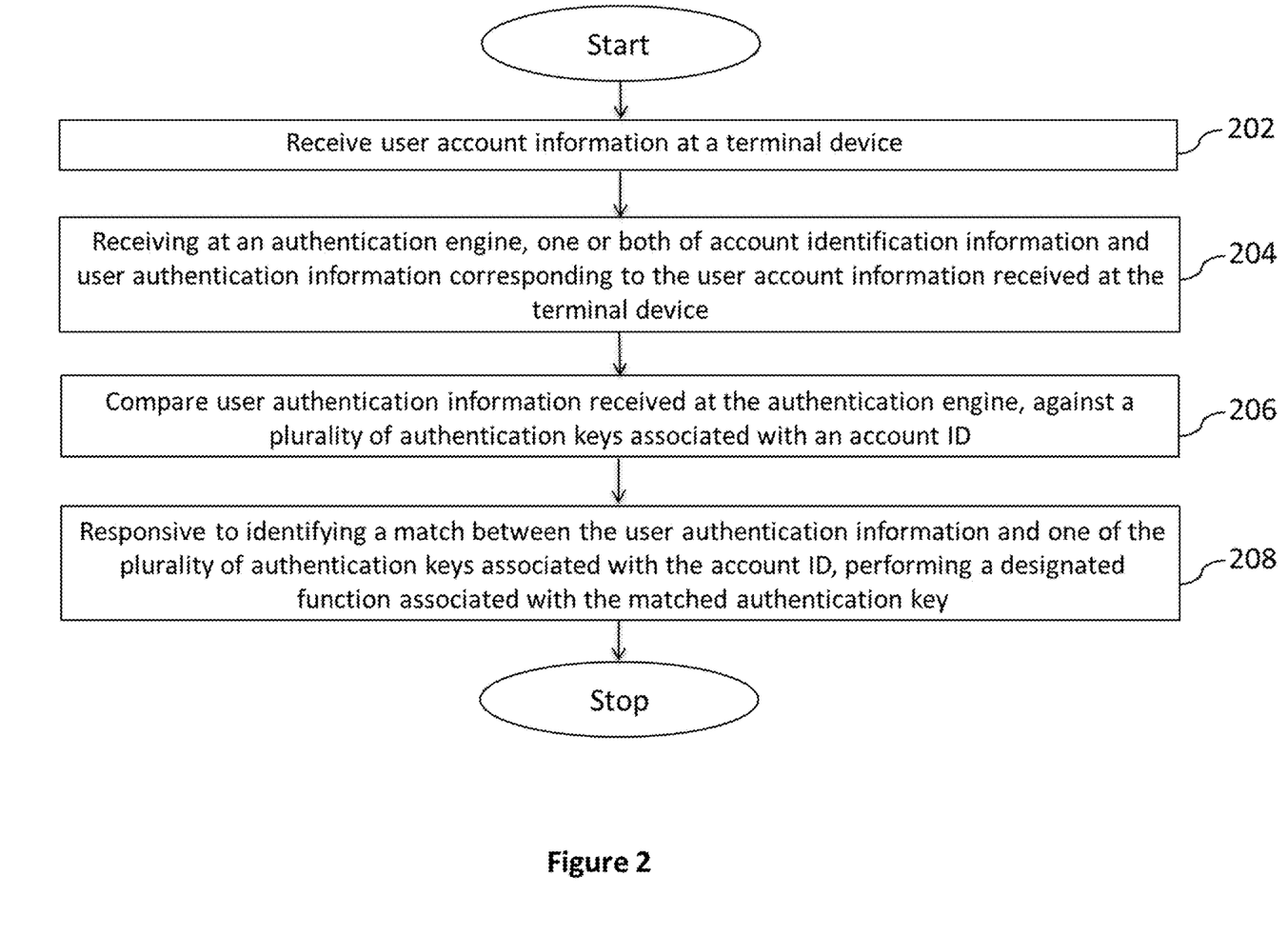
FIGS. 2 and 3 illustrate flowcharts corresponding to methods in accordance with the present invention.

FIG. 2 illustrates a method in accordance with the present invention.

Step 202 comprises receiving user account information at a terminal device. User account information may include (i) account identification information (e.g., payment card information or payment card account identification information) and (ii) user authentication information (for example, a password or PIN). In an embodiment when the terminal device is a POS terminal, the account identification information may be acquired by the POS terminal reading a payment card magnetic stripe. In an embodiment when the terminal device is a computing device or telecommunication device, acquisition of the account identification information may be achieved by way of user input at the terminal device (for example by way of user input specifying the payment card number and optionally one or more of the payment card expiry date and card verification value number, or by submitting an image or snapshot of the payment card through an imaging device). In an embodiment, the authentication information may be input by the user through the terminal device or any peripheral device coupled with the terminal device that enables user inputs. The user authentication information may in various embodiments comprise one or more of numeric information, alphanumeric information, biometric information or any other information capable of serving as a secure authentication key.

Step 204 comprises receiving at an authentication engine, one or both of account identification information and user authentication information received at the terminal device at step 202. In an embodiment, the user authentication information received at the authentication engine may comprise an authentication key input by or received from a user at the terminal device, either in encrypted or unencrypted form. In another embodiment, the received user authentication information may comprise an encrypted or unencrypted derivative of an authentication key input by or received from a user at the terminal device.

It would be understood that the authentication engine discussed in connection with step 204 may comprise any processing device configured to implement an authentication function—and that the authentication engine may in various embodiments be located within any one of the card network, issuer network or acquirer network or for that matter may be located outside of all of said networks (in which case said authentication engine is communicably coupled with at least one of said networks).

Step 206 comprises comparing user authentication information received at the authentication engine, against a plurality of authentication keys associated with a specific account identifier (for example a payment card number or a payment card account ID). In an embodiment the account identifier selected for matching of authentication keys may be based on account identification information received at step 202 at the terminal device.

Step 208 comprises responding to identification of a match at step 206 (i.e., between the received user authentication information and one of the plurality of user authentication keys associated with a specific account identifier) by performing a designated function or action associated with the matched authentication key. The performed designated function may be selected from among a group of designated functions associated with the specific account identifier, based on identifying a predefined association between the performed designated function and the matched authentication key. Once again referring for example to FIG. 4, in the event step 204 comprises receiving account identification information corresponding to account ID "WWWW.XXXX.YYYY.ZZZZ" and receiving authentication key 1234, step 206 would determine a match with one of the authentication keys associated with said account ID, and step 208 would thereafter result in implementation of the designated function that is associated with authentication key 1234—i.e., authorization of a requested payment card transaction.

In an embodiment of step 208, selection of a designated function from among the group of designated functions associated with the specific account identifier, is based exclusively on existence of a predefined association between the selected designated function and the matched authentication key. Stated differently, selection of a designated function from among the group of designated functions associated with the specific account identifier is independent of any additional user inputs (other than input of user authentication information) necessary to identify a designated function for selection. In a particular embodiment, the user input at the terminal device is limited to input of a payment card identifier and user authentication information, and excludes any additional input for selecting a designated function.

The invention additionally contemplates methods for enrolling one or more authentication keys corresponding to a payment card, payment card account or card holder, and for correlating the authentication key with a corresponding designated function. In an embodiment, the enrollment process may involve the steps of (i) receiving from a user, user input selecting a specific function from among a plurality of functions that are capable of being executed or implemented in response to an instruction from the authentication engine. For example, the plurality of functions may include authorizing a payment card transaction, generating and transmitting a financial report based on account holder data available with the issuer network, generating and transmitting a financial report based on account holder data available with the card network, and generating and transmitting a financial report based on account holder data available with both the issuer network and the card network.

(ii) responsive to selection of a specific function from among a plurality of functions that are capable of being executed or implemented in response to an instruction from the authentication engine, the user may provide user input for use as an authentication key that can be associated with the selected specific function.

(iii) the received user input (or a set of data or information derived from the user input—for example by way of a hash function or other processing function) may thereafter be recorded as the authentication key associated with the selected specific function—such that subsequent receipt of said authentication key may thereafter be used as an instruction to implement the selected specific function (i.e. as a result of the recorded association).

(iv) The above process may be repeated so as to associate unique authentication keys with more than one (and preferably all) of the plurality of functions that are capable of being executed or implemented in response to an instruction from the authentication engine.

In certain embodiments, the step of prompting a user to input an authentication key may be preceded by a step of prompting a user to specify an authentication key type, or to select from among a plurality of authentication key types. Exemplary authentication key types may include an alphanumeric key type, iris, retina or eye based biometric key types, facial feature based biometric key type, fingerprint based biometric key type, image based key type, audio based key type, etc. Depending on the authentication key type selected by the user, the user may thereafter be provided with specific instructions for enrolling the authentication key—e.g., in case of a fingerprint or iris based biometric key type, the user may be provided with directions for positioning the desired biometric feature in a specific orientation relative to the biometric sensor. The authentication key or user input may thereafter be acquired/captured and processed in the manner discussed above. It would be understood that in certain embodiments, the user may select (or alternatively the method or apparatus may mandatorily require) different authentication key types to be associated with different functions. For example, an authentication key associated with authorization of a payment transaction may comprise a first authentication key type (e.g., an alphanumeric key), while an authentication key associated with generation of a financial report may require a second authentication key type (e.g., a biometric feature based authentication). In one embodiment, authorization of payment transactions below a predefined amount may require a first authentication key type (e.g., a less secure authentication key type such as an alphanumeric key), while authorization of payment transactions above the predefined amount may require a second authentication key type (e.g., a more secure authentication key type such as a biometric feature based key). In certain embodiments, the invention may permit for associating specific designated functions with a plurality of authentication keys—such that triggering the designated function would require input of the associated plurality of authentication keys. By way of an explanatory example, the function of authorizing payment transactions above a certain limit may require an alphanumeric key as well as a biometric based key associated therewith—wherein a user would be required to correctly provide an alphanumeric authentication key and also to present the enrolled biometric feature to authenticate or trigger the transaction.

Figure 3:
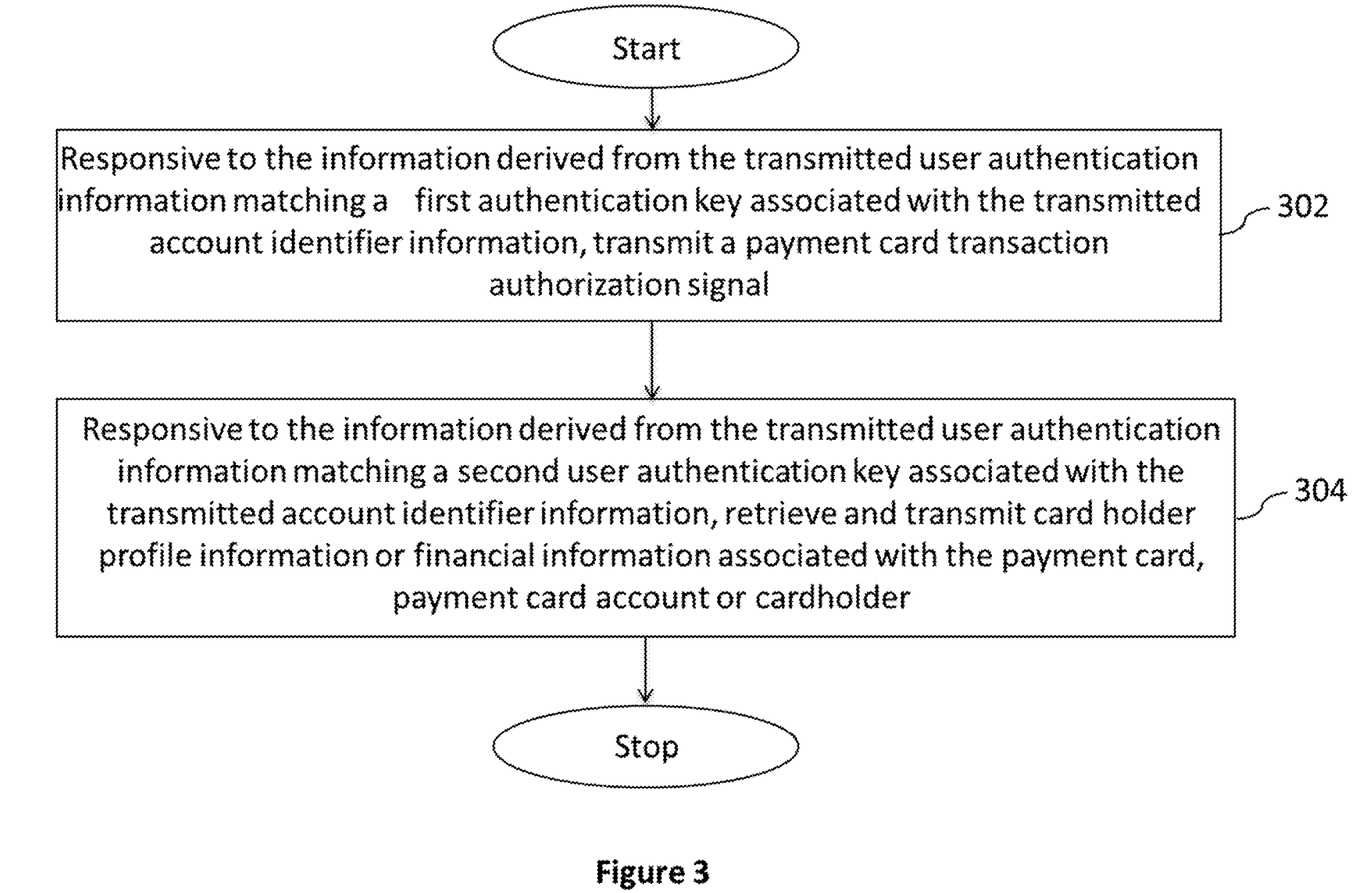

FIG. 3 illustrates a flowchart illustrating a specific embodiment of method step 208 that has been more generally discussed in connection with FIG. 2 above. The embodiment of FIG. 3 involves a system configuration wherein each payment card or payment card account (or account ID corresponding to a payment card or payment card account) has at least a first authentication key and a second authentication key associated therewith. The first authentication key has a corresponding first designated function associated therewith, while the second authentication key has a corresponding second designated function associated therewith. In the specific embodiment illustrated in FIG. 3, the first designated function comprises authorizing a payment card transaction that has been requested at the terminal device, while the second designated function comprises generating and transmitting card holder profile information or financial history information (or both) associated with the payment card, payment card account or card holder.

Accordingly, at step 302, determination of a match between user authentication information (that has been received at step 204 and matched at step 206 of FIG. 2), and a first authentication key associated with the transmitted account identification information (that has also been transmitted at step 204 of FIG. 2), results in authorization of a payment card transaction requested at the terminal device (i.e. implementation of the first designated function associated with the first authentication key).

Responsive to a non-match decision at step 302, the method moves on to step 304. At step 304, a determination of a match between the user authentication information and a second authentication key associated with the transmitted account identifier information results in retrieval and transmission of one or both of card holder profile information and financial history information associated with the payment card, payment card account or card holder (i.e., implementation of the second designated function associated with the second authentication key). Said information may in an embodiment be transmitted to the terminal device.

While FIG. 3 illustrates only a two-step method step corresponding to an embodiment involving two authentication keys (and corresponding designated functions) associated with a payment card or a payment card account, it would be understood that any number of authentication keys (and corresponding designated functions) may be associated with each payment card or payment card account. In such cases, the method of FIG. 3 would continue checking for a match between user authentication information received from a terminal device and the authentication keys associated with a payment card account (also identified based on information received from the terminal device) until a match is found or until all associated authentication keys have been checked and have been determined to be non-matching.

In an embodiment of the invention, the card holder profile information or financial history information (or both) associated with the payment card, payment card account or card holder may include one or more of the card holder name or address, location of the card holder or the card holder's business establishment, the total value of transactions carried out using a payment card over a fixed period of time (e.g., over the last six months), categories of spend in connection with recent transactions made over a fixed period of time, credit score, repayment score, total value of late payment penalties accumulated or paid over a fixed period of time, and any other information that may be useful to establishing or representing a card holder's antecedents or financial credibility. In an embodiment of the invention, the transmitted card holder profile information or financial history information (or both) may be in the form of a consolidated information report. In various embodiments, the content of card holder profile information or financial history information (or both) that is generated at step 304 may be determined based on a predefined set of rules.

In an embodiment of the method discussed in connection with FIG. 3 (and subsequently in connection with FIG. 5), transmission of the card holder profile information or financial history information (or both) may involve payment of a service fee. In a specific embodiment, this service fee may be charged as a service fee to the payment card or to the payment card account associated with the card holder.

The data structure 400 illustrated in FIG. 4 is an exemplary data structure (or a part of a data structure) that stores account ID information corresponding to at least two account IDs (i.e. first account ID WWWW.XXXX.YYYY.ZZZZ and second account ID PPPP.QQQQ.RRRR.SSSS) along with their respectively associated authentication keys and corresponding designated functions. In the illustrated embodiment, each account ID within data structure 400 has three associated authentication keys—each authentication key having a corresponding designated function.

Implementing the method steps of FIG. 2 in connection with the data structure 400, would result in implementation of the following:

Responsive to receipt (at the authentication engine at step 204) of (i) account identification information corresponding to account ID "WWWW.XXXX.YYYY.ZZZZ" and (ii) user authentication information corresponding to authentication key 1234, step 208 would result in authorization of a requested payment card transaction.

Responsive to receipt (at the authentication engine at step 204) of (i) account identification information corresponding to account ID "WWWW.XXXX.YYYY.ZZZZ" and (ii) user authentication information corresponding to authentication key 2345, step 208 would result in generation and transmission of a financial report based on account holder data available with the issuer network.

Responsive to receipt (at the authentication engine at step 204) of (i) account identification information corresponding to account ID "WWWW.XXXX.YYYY.ZZZZ" and (ii) user authentication information corresponding to authentication key 3456, step 208 would result in generation and transmission of a financial report based on account holder data available with the card network.

Responsive to receipt (at the authentication engine at step 204) of (i) account identification information corresponding to account ID "PPPP.QQQQ.RRRR.SSSS" and (ii) user authentication information corresponding to authentication key 4567, step 208 would result in authorization of a requested payment card transaction.

Responsive to receipt (at the authentication engine at step 204) of (i) account identification information corresponding to account ID "PPPP.QQQQ.RRRR.SSSS" and (ii) user authentication information corresponding to authentication key 5678, step 208 would result in generation and transmission of a financial report based on account holder data available with the issuer network.

Responsive to receipt (at the authentication engine at step 204) of (i) account identification information corresponding to account ID "PPPP.QQQQ.RRRR.SSSS" and (ii) user authentication information corresponding to authentication key 6789, step 208 would result in generation and transmission of a financial report based on account holder data available with the card network.

It will be understood that the numeric authentication keys illustrated in FIG. 4 are merely exemplary, and that any other form or type of authentication key or authentication information is equally implementable for the purposes of the present invention, including alphanumeric keys, special character based keys or biometric information. In an example, each account ID may have a separate biometric template (or biometric identifier) stored as an authentication key—with a corresponding designated function associated with said biometric template—for example, a card holder thumbprint may be stored as a first authentication key, while the card holder's index finger print may be stored as a second authentication key. Responsive to the card holder presenting his thumbprint at the terminal device, a first designated function associated with said thumbprint may be implemented at step 208, while presentation of the card holder's index finger print at the terminal device would result in a second designated function that has been associated with said index finger print being implemented at step 208. In other embodiments, each authentication key may comprise a different type of biometric selected from a group of biometric types (e.g. fingerprint based biometrics, iris based biometrics, retina based biometrics, facial feature based biometrics etc.).

It would also be understood that for the purposes of generating a customer report, financial report or credit report, the present invention may request or retrieve information from one or more of a plurality of databases, including databases within the issuer network, databases within the card network, or third party databases that are capable of providing the necessary information. In a more specific embodiment, the information within a customer report, financial report or credit report may be acquired from a plurality of disaggregated databases, and may be consolidated or aggregated into a report prior to transmission to the terminal device. In a more particular embodiment, the method may include steps for sharing the service fee received for generating a report, among the one or more providers of the information eventually included in the report transmitted to the terminal device.

Figure 5:
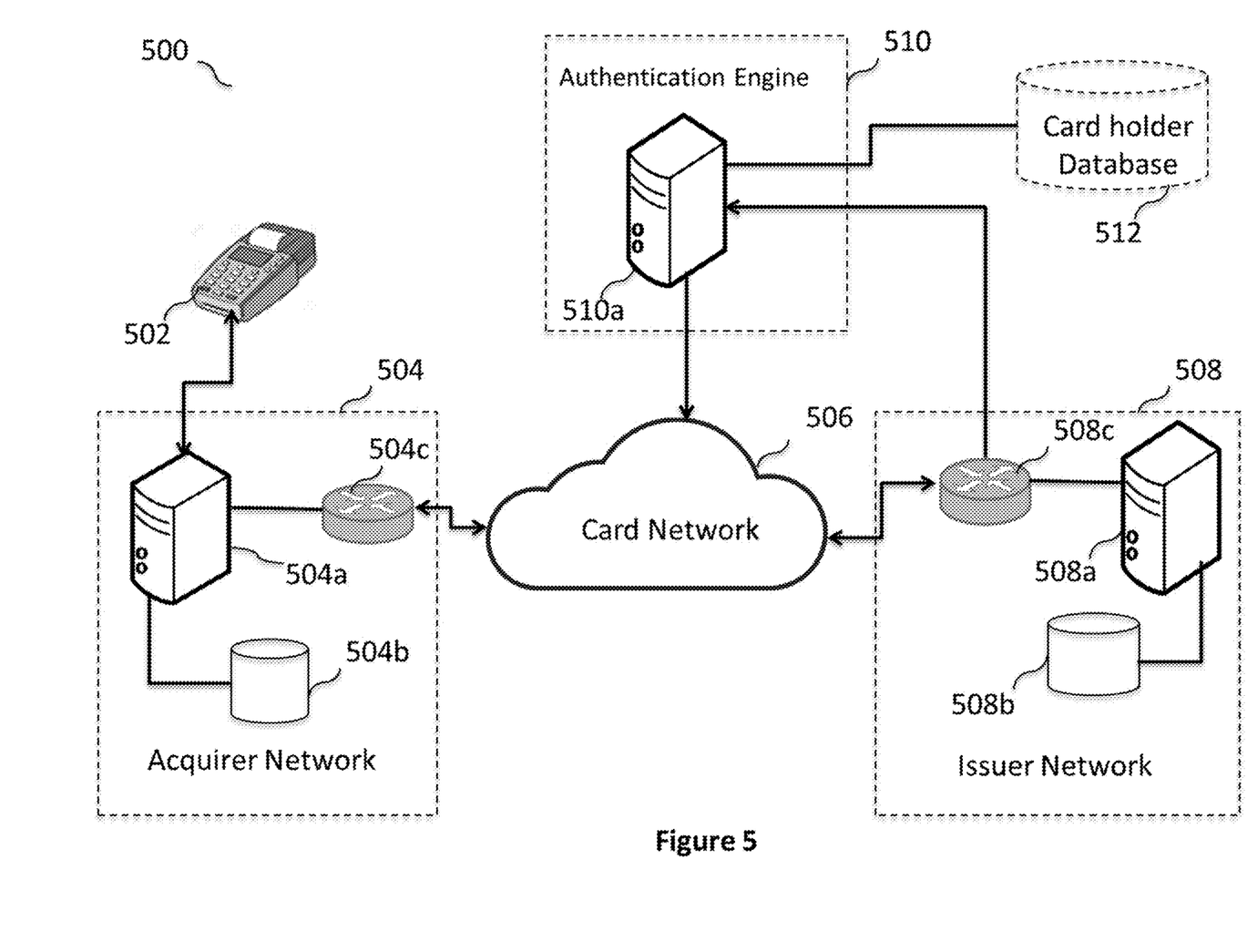
FIG. 5 illustrates a system configured to implement payment card transactions and to obtain and communicate authenticated identity information or financial history information (or both) corresponding to a card holder, to a terminal device.

FIG. 5 illustrates a system 500 that can be used for implementing the above discussed embodiments of the invention. System 500 includes terminal device 502, acquirer network 504, card network 506, issuer network 508, authentication engine 510 and optionally card holder database 512.

Terminal device 502 may in various non-limiting embodiments comprise any of a POS terminal, a computing device, a wired line telephone, a mobile phone or a smartphone. In an embodiment, terminal device 102 may be configured to receive user account information as discussed in connection with step 202 of FIG. 2. In an embodiment, terminal device 502 may additionally be configured to receive a payment card transaction authorization signal (for example, the payment card transaction authorization signal discussed in connection with step 302 of FIG. 3) and optionally to display, print or render a transaction authorization message or alert or a transaction completion message or alert. Terminal device 502 may in an embodiment be configured to receive card holder profile information or financial history information associated with a payment card, payment card account or card holder (for example, the information retrieved or transmitted at step 304 of FIG. 3), and optionally to display, print or render such information.

Acquirer network 504 may be communicably coupled with terminal device 502, and may comprise server 504a, acquirer network database 504b and interface gateway 504c. Server 504a may be configured to receive and process information relating to payment card transactions. In certain embodiments, the acquirer network may only receive or process transactions received from merchants having a merchant account with the acquirer—which determination may be made based on information retrieved from acquirer network database 504b. Interface gateway 504c may include a hardware or software network gateway configured to enable acquirer network 504 to communicate with entities outside of acquirer network 504 (for example, card network 506).

Card network 506 may be communicably coupled to both acquirer network 504 and issuer network 508, and may, in certain embodiments, serve as a communication intermediary between the acquirer network and the issuer network.

Issuer network 508 may comprise server 508a, issuer network database 508b and interface gateway 508c. Server 508a may be configured to receive and process information relating to payment card transactions. In an embodiment, the issuer network may only receive or process transactions received from merchants having a merchant account with the issuer—which determination may be made based on information retrieved from issuer network database 508b. Interface gateway 508c may include a hardware or software network gateway configured to enable issuer network 508 to communicate with entities outside issuer network 508 (for example, card network 506 or authentication engine 510).

Authentication engine 510 comprises authentication engine server 510a, which may be communicably coupled with one or both of card network 506 and issuer network 508. Authentication engine 510 may optionally also be communicatively coupled with card holder database 512 or with any other database containing data records that are capable of being used to identify or authenticate a user or device. In certain embodiments, authentication engine 510 may be located within card network 506, or within issuer network 508, or outside of (but in communication with) both networks. Authentication engine 510 may additionally be configured to implement any one or more of steps 204 to 208 of FIG. 2, and any one or more of steps 302 and 304 of FIG. 3 and their various embodiments (as described in detail above). In an embodiment of the invention, in retrieving card holder profile information or financial history information associated with a payment card (at step 304 of FIG. 3) or with a payment card account or with a card holder, authentication engine 510 may access or retrieve card holder specific or payment card specific data from card holder database 512. Card holder database 512 may in various embodiments be located within issuer network 508 or within card network 506, or may comprise a third party database having the necessary information. In an embodiment (not illustrated), authentication engine 510 may access or retrieve card holder specific or payment card specific data (at step 304 of FIG. 3) from a plurality of disaggregated card holder databases, the plurality of disaggregated card holder databases being located within one or more of the issuer network, the card network or a third party network.

In various embodiments, authentication engine 510 may be configured to implement any authentication function involving a comparison between user authentication information received at a terminal device and one or more authentication keys associated with an account identifier—and further to generate a match or a non-match decision based on the comparison. The authentication engine 510 may be configured to effect comparisons between numeric strings, alphanumeric strings, strings which include special characters, biometric templates (for example, iris templates or fingerprint templates) extracted from biometric information recorded at a biometric sensor, image information, audio information, etc. Additionally, in certain embodiments (for example, where the authentication engine 510 is configured to effect comparisons in respect of multiple different authentication key types), said authentication engine 510 may include a plurality of comparator engines, wherein the plurality of comparator engines may each be configured to implement a different comparator function. In one embodiment, each of the plurality of comparator engines may be configured to implement a comparison function corresponding to a different authentication key type—for example, different authentication key types selected from the group consisting of alphanumeric key type, iris, retina or eye based biometric key type, facial feature based biometric key type, fingerprint based biometric key type, image based key type and audio based key type. In a specific embodiment, authentication engine 510 may include the plurality of comparator engines discussed above, and may additionally include a comparator engine selector that analyzes a received user input, determines an authentication key type that said user input relates to, and transmits the received user input to the corresponding comparator engine that is configured to implement a comparison function based on the determined authentication key type.

In a specific embodiment of the invention, authentication engine 510 may be configured to implement one or more of iris, fingerprint and image based comparisons against pre-stored authentication keys—and may additionally be configured to use a centralized or external database of biometric information (for example the Unique Identification Authority of India database of biometric information offered by the Government of India) to retrieve biometric information associated with a card holder/user and to use the retrieved biometric information as an authentication key against which user inputs can be compared for authenticating a user.

It would additionally be understood that in various embodiments, authentication engine 510 may transmit transaction authorizations (see step 302 of FIG. 3) or card holder profile information or financial history information associated with a payment card, payment account or card holder (see step 304 of FIG. 3) to terminal device 502 either directly through card network 506, or routed through issuer network 508.

Figure 6:
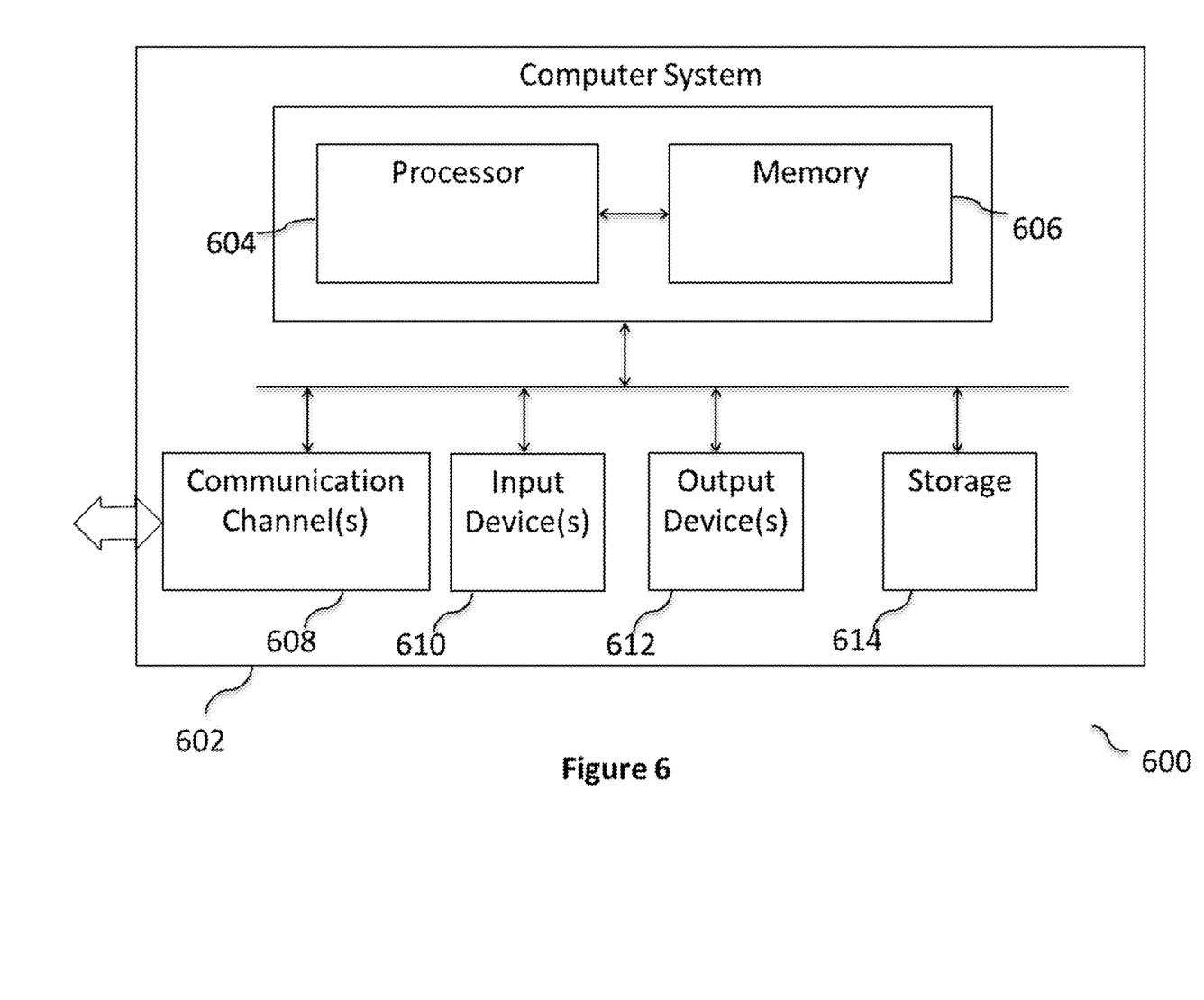
FIG. 6 illustrates an exemplary computer system according to which various embodiments of the present invention may be implemented.

FIG. 6 illustrates an exemplary system 600 for implementing the present invention.

The computing system 602 comprises one or more processors 604 and at least one memory 606. Processor 604 is configured to execute program instructions—and may be a real processor or a virtual processor. It will be understood that computer system 602 does not suggest any limitation as to scope of use or functionality of described embodiments. The computer system 602 may include, but is not be limited to, one or more of a general-purpose computer, a programmed microprocessor, a micro-controller, an integrated circuit, and other devices or arrangements of devices that are capable of implementing the steps that constitute the method of the present invention. Exemplary embodiments of a system 602 in accordance with the present invention may include one or more servers, desktops, laptops, tablets, smart phones, mobile phones, mobile communication devices, tablets, phablets and personal digital assistants. In an embodiment of the present invention, the memory 606 may store software for implementing various embodiments of the present invention. The computer system 602 may have additional components. For example, the computer system 602 may include one or more communication channels 608, one or more input devices 610, one or more output devices 612, and storage 614. An interconnection mechanism (not shown) such as a bus, controller, or network, interconnects the components of the computer system 602. In various embodiments of the present invention, operating system software (not shown) provides an operating environment for various software executing in the computer system 602 using a processor 604, and manages different functionalities of the components of the computer system 602.

The communication channel(s) 608 allow communication over a communication medium to various other computing entities. The communication medium provides information such as program instructions, or other data in a communication media. The communication media includes, but is not limited to, wired or wireless methodologies implemented with an electrical, optical, RF, infrared, acoustic, microwave, Bluetooth or other transmission media.

The input device(s) 610 may include, but is not limited to, a touch screen, a keyboard, mouse, pen, joystick, trackball, a voice device, a scanning device, or any another device that is capable of providing input to the computer system 602. In an embodiment of the present invention, the input device(s) 610 may be a sound card or similar device that accepts audio input in analog or digital form. The output device(s) 612 may include, but not be limited to, a user interface on CRT, LCD, LED display, or any other display associated with any of servers, desktops, laptops, tablets, smart phones, mobile phones, mobile communication devices, tablets, phablets and personal digital assistants, printer, speaker, CD/DVD writer, or any other device that provides output from the computer system 602.

The storage 614 may include, but not be limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 602. In various embodiments of the present invention, the storage 614 may contain program instructions for implementing any of the described embodiments.

In an embodiment of the present invention, the computer system 602 is part of a distributed network or a part of a set of available cloud resources.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 602. The method described herein is typically implemented as a computer program product, comprising a set of program instructions that is executed by the computer system 602 or any other similar device. The set of program instructions may be a series of computer readable codes stored on a tangible medium, such as a computer readable storage medium (storage 614), for example, diskette, CD-ROM, ROM, flash drives or hard disk, or transmittable to the computer system 602, via a modem or other interface device, over either a tangible medium, including but not limited to optical or analogue communications channel(s) 608. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

Based on the above, it would be apparent that the present invention offers certain significant advantages. One immediate benefit is that a card holder may now demonstrate financial credibility through an authenticated financial report generated at a POS terminal or other terminal device, in a simplified manner. A second benefit is that the authenticated financial report may include financial data of the card holder or payment card account from multiple sources, which can be conveniently consolidated and forwarded to the requesting customer or card holder. Additionally, since the selection of a response by the authentication engine (i.e., selection between transaction authorization mode, and generation of financial score mode) is based on the account information (e.g., user authentication information, authentication key or PIN) entered by a user at a terminal device, the invention ensures that a customer may select between multiple available responses with a reduced set of inputs at the terminal device.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims. Additionally, the invention illustratively disclose herein suitably may be practiced in the absence of any element which is not specifically disclosed herein—and in a particular embodiment specifically contemplated, is intended to be practiced in the absence of any element which is not specifically disclosed herein.

The invention claimed is:

1. A method for implementing a selective response to presentation of payment card information, comprising:

receiving, from a point-of-sale (POS) terminal device that is interacted with by a payment card of a user, payment card account information comprising a payment card account identifier of the payment card and user authentication information comprising a biometric key at an authentication engine server;

accessing, by the authentication engine server, one of a plurality of predefined authentication keys associated with the payment card account identifier that are stored in an account ID information data structure;

determining, by the authentication engine server, that the received biometric key matches one of the plurality of predefined authentication keys associated with the payment card account identifier that are stored in the account ID information data structure, each of the plurality of predefined authentication keys also being associated with at least one predefined function of a plurality of predefined functions such that receipt of that biometric key initiates execution of the associated at least one predefined function;

wherein the plurality of predefined functions comprises a first predefined function associated with a first predefined biometric key of the plurality of predefined authentication keys and a second predefined function associated with a second predefined biometric key of the plurality of predefined authentication keys that is a different biometric key than the first predefined biometric key, wherein the first predefined function comprises authorization of a requested electronic payment transaction; and wherein the second predefined function comprises transmitting, to the POS terminal device, financial history information corresponding to the payment card account identifier;

responsive to the received biometric key matching one of the plurality of predefined authentication keys associated with the payment card account identifier that are stored in the account ID information data structure, selecting, by the authentication engine server, a predefined function associated with the one of the plurality of predefined authentication keys that matches the received biometric key, the predefined function being selected from among at least the first and second predefined functions; and implementing, by the authentication engine server, the selected predefined function of the plurality of predefined functions, the plurality of predefined functions including the authorization of the requested electronic payment transaction and the transmitting of the financial history information corresponding to the payment card account identifier.

2. The method as claimed in claim 1, wherein the selected predefined function is the second predefined function of the transmitting of the financial history information corresponding to the payment card account identifier, the method further comprising transmitting to the POS terminal device the financial history information corresponding to the payment card account identifier for displaying, printing, or rendering at the POS terminal device.

3. The method as claimed in claim 2, further comprising retrieving the financial history information from at least one of a card network database and an acquirer network database.

4. The method as claimed in claim 3, wherein the financial history information comprises data retrieved from both the card network database and the acquirer network database.

5. The method as claimed in claim 4, further comprising responsive to selection of the second predefined function, charging a service fee associated with transmission of financial history information to the payment card, and crediting a first share of the service fee to a card network and a second share of the service fee to an issuer network.

6. The method as claimed in claim 1, wherein selection of the predefined function from among the first and second predefined functions is based exclusively on the association between the selected predefined function and the authentication key that has been matched with the received biometric key.

7. The method as claimed in claim 1, further comprising in response to selection of the second predefined function, charging a service fee associated with transmission of financial history information to the payment card.

8. The method as claimed in claim 1, wherein the user authentication information is received by the POS terminal device and further comprises a secondary authentication key.

9. The method as claimed in claim 8, wherein the secondary authentication key is an iris, retina or eye based biometric key type, facial feature based biometric key type, fingerprint based biometric key type, image based key type, or audio based key type.

10. The method of claim 1, wherein the first predefined biometric key of the plurality of predefined authentication keys is a fingerprint based biometric key type and the second predefined biometric key of the plurality of predefined authentication keys is a facial feature based biometric key type.

11. The method of claim 1, wherein the first predefined biometric key of the plurality of predefined authentication keys is a thumbprint of the user and the second predefined biometric key of the plurality of predefined authentication keys is an index finger of the user.

12. A system for implementing a selective response to presentation of payment card information, comprising:
a processor implemented authentication engine configured to:
receive, from a point-of-sale (POS) terminal device that is interacted with by a payment card of a user, payment card account information comprising a payment card account identifier of the payment card and user authentication information comprising a biometric key;
access one of a plurality of predefined authentication keys associated with the payment card account identifier stored in an account ID information data structure;
determine that the received biometric key matches one of the plurality of predefined authentication keys associated with the payment card account identifier that are stored in the account ID information data structure, each of the plurality of predefined authentication keys also being associated with at least one predefined function of a plurality of predefined functions such that receipt of that biometric key initiates execution of the associated at least one predefined function;
wherein the plurality of predefined functions comprises a first predefined function associated with a first predefined biometric key of the plurality of predefined authentication keys and a second predefined function associated with a second predefined biometric key of the plurality of predefined authentication keys that is a different biometric key than the first predefined biometric key,
wherein the first predefined function comprises authorization of a requested electronic payment transaction; and
wherein the second predefined function comprises transmitting, to the POS terminal device, financial history information corresponding to the payment card account identifier;
responsive to the received biometric key matching one of the plurality of predefined authentication keys associated with the payment card account identifier that are stored in the account ID information data structure, select a predefined function associated with the one of the plurality of predefined authentication keys that matches the received biometric key, the predefined function being selected from among at least the first and second predefined functions; and
implement the selected predefined function of the plurality of predefined functions, the plurality of predefined functions including the authorization of the requested electronic payment transaction and the transmitting of the financial history information corresponding to the payment card account identifier.

13. The system as claimed in claim 12, wherein the selected predefined function is the second predefined function of the transmitting of the financial history information corresponding to the payment card account identifier, wherein the processor implemented authentication engine is further configured to transmit to the POS terminal device the financial history information corresponding to the payment card account identifier for displaying, printing, or rendering at the POS terminal device.

14. The system as claimed in claim 12, wherein the authentication engine is configured such that selection of the predefined function from among the first and second predefined functions is based exclusively on the association between the selected predefined function and the authentication key that has been matched with the received biometric key.

15. The system as claimed in claim 12, wherein the authentication engine is further configured to retrieve the financial history information from at least one of a card network database and an acquirer network database.

16. The system as claimed in claim 15, wherein the authentication engine is configured such that the financial history information comprises data retrieved from both the card network database and the acquirer network database.

17. The system as claimed in claim 16, wherein the authentication engine is further configured to charge a service fee associated with transmission of financial history information to the payment card responsive to selection of the second predefined function, and credit a first share of the service fee to a card network and credit a second share of the service fee to an issuer network.

18. The system as claimed in claim 12, wherein the authentication engine is further configured to charge a service fee associated with transmission of financial history information to the payment card responsive to selection of the second predefined function.

19. A computer program product for implementing a selective response to presentation of payment card information, comprising a non-transitory computer usable medium having computer readable program code embodied therein, the computer readable program code comprising instructions for:
receiving, from a point-of-sale (POS) terminal device that is interacted with by a payment card of a user, payment card account information comprising a payment card account identifier of the payment card and user authentication information comprising a biometric key;
accessing one of a plurality of predefined authentication keys associated with the payment card account identifier stored in an account ID information data structure;
determining that the received biometric key matches one of the plurality of predefined authentication keys associated with the payment card account identifier that are stored in the account ID information data structure, each of the plurality of predefined authentication keys also being associated with at least one predefined function of a plurality of predefined functions such that receipt of that biometric key initiates execution of the associated at least one predefined function;
wherein the plurality of predefined functions comprises a first predefined function associated with a first predefined biometric key of the plurality of predefined authentication keys and a second predefined function associated with a second predefined biometric key of the plurality of predefined authentication keys that is a different biometric key than the first predefined biometric key,
wherein the first predefined function comprises authorization of a requested electronic payment transaction; and
wherein the second predefined function comprises transmitting, to the terminal device, financial history information corresponding to the payment card account identifier;
responsive to the received biometric key matching one of the plurality of predefined authentication keys associated with the payment card account identifier that are stored in the account ID information data structure, selecting a predefined function associated with the one of the plurality of predefined authentication keys that matches the received biometric key, the predefined function being selected from among at least the first and second predefined functions; and implementing the selected predefined function of the plurality of predefined functions, the plurality of predefined functions including the authorization of the requested electronic payment transaction and the transmitting of the financial history information corresponding to the payment card account identifier.

* * * * *